DUAL MODULATED REMOTE CONTROL TRANSMITTER

Filed Dec. 16, 1965

Willard S. Reynolds
INVENTOR.
BY Clarence A. O'Brien
and Harvey B. Jacobson
Attorneys United States Patent Office 3,316,488

Patented Apr. 25, 1967

3,316,488

DUAL MODULATED REMOTE CONTROL TRANSMITTER

Willard S. Reynolds, Hollywood, Fla., assignor to Telectron Company, division of Elliott & Evans, Inc., a corporation of Ohio Filed Dec. 16, 1965, Ser. No. 514,208
11 Claims. (Cl. 325—105)

This invention relates to radiant energy types of remote control systems such as disclosed in prior copending application Ser. No. 334,791, filed Dec. 31, 1963, now Patent No. 3,271,680 with respect to which the present application is a continuation-in-part. More particularly, the present invention pertains to an improved type of transmitter component adapted to replace or modify the transmitter component as disclosed in the aforementioned prior copending application embodying certain principles thereof.

It is therefore a primary object of the present invention to provide a dual modulated type of transmitter capable of radiating signal energy at a selected carrier frequency which is sequentially modulated at two or more audio modulating frequencies in order to establish a coded trigger for remote radio controlled equipment.

An important improvement of the present invention is to provide a transmitter circuit whereby closing of a power switch is automatically operative to initiate radiation of signal energy at the carrier frequency modulated for automatically timed initial period of limited duration at a first audio modulating frequency, the signal being continued with a second audio modulating frequency thereafter for an indefinite period or until the power switch is released and opens.

An additional object of the present invention is to provide a transmitter circuit of the aforementioned type whereby the modulating circuits may be individually tuned to control the sequence and duration of the modulating frequency signals.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
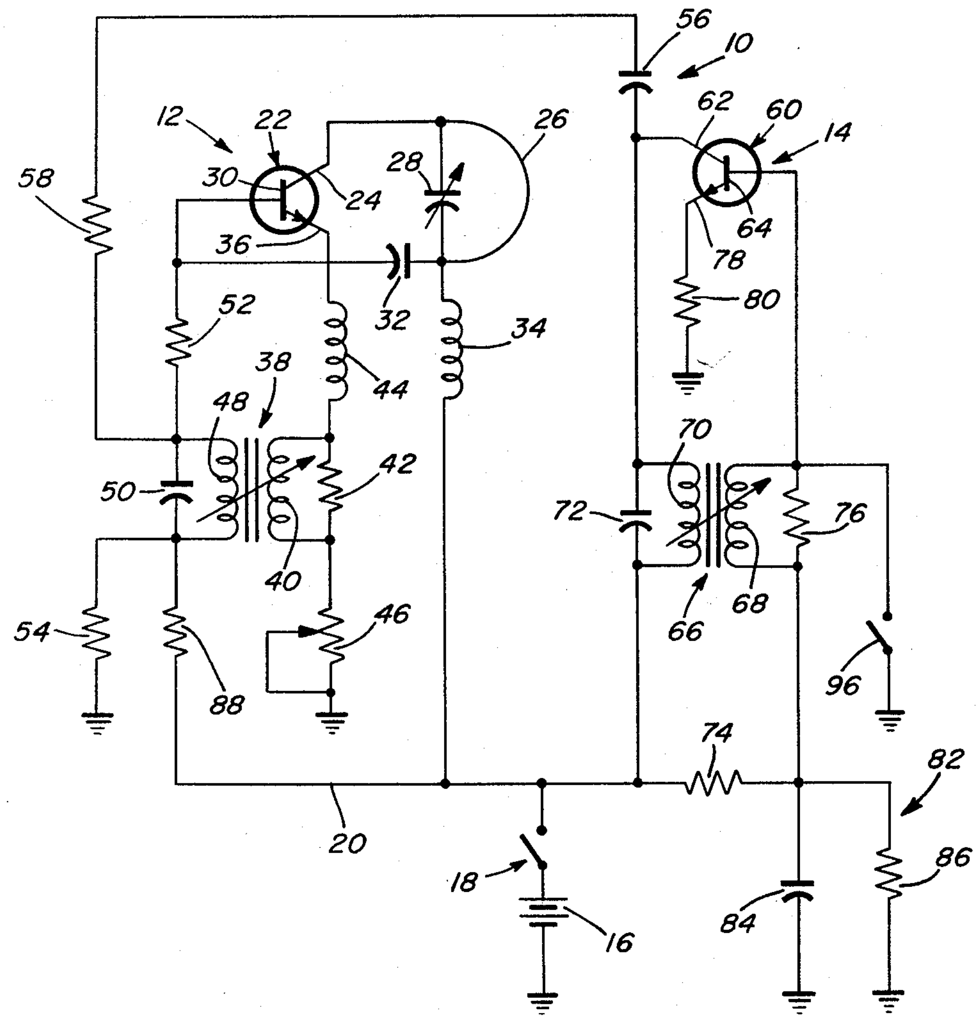
FIGURE 1 is a circuit diagram of the transmitter.

Referring now to the drawings in detail, FIGURE 1 shows the transmitter circuit generally denoted by reference numeral 10 including two audio sections 12 and 14. The transmitter may be powered from any suitable constant source of voltage such as the battery 16 having a grounded terminal and an outpost terminal connected to a push button power switch 18. The push button switch 18 is adapted to be closed by the operator in order to connect the output terminal of battery 16 to the various components of the transmitter circuit through a voltage line 20.

The first audio section 12 of the circuit is similar to the transmitter component shown in FIGURE 3 of the prior copending application aforementioned except for the manual switch control and includes a combined radio and audio frequency oscillator circuit having a PNP type of transistor 22. The output collector 24 of transistor 22 is connected to a tank circuit including an inductive antenna loop 26 and a variable tuning capacitor 28 adjusted to produce output oscillations having a carrier frequency within the radio frequency range. A feedback path is established between the tank circuit and the base 30 of the transistor 22 by means of the feedback capacitor 32.

Radio frequency oscillations are therefore sustained within the tank circuit for radiation from the antenna loop 26 when supplied with energy from the battery 16. Accordingly, the tank circuit is connected by the radio frequency choke coil 34 to the voltage line 20.

In order to superimpose an audio frequency modulation signal on the carrier signal output, the emitter 36 and base 30 of the transistor 22 are regeneratively coupled by an audio frequency tuned transformer 38 having a primary winding 40 shunted by resistor 42 which limits current through the primary connected to the emitter 36 by the radio frequency choke coil 44. The bias condition of the emitter 36 is regulated by means of an adjustable resistor 46 connected to ground in series with resistor 42 and choke coil 44. The transformer 38 also includes the output winding 48 connected in parallel with a tuning capacitor 50. The output winding 48 of the audio frequency tuned transformer 38 is therefore connected to the base 30 of transistor 22 by the signal coupling resistor 52 for supply of self-sustaining audio oscillations thereto. The bias condition of the base 30 is controlled by means of resistor 54 connected to ground in series with capacitor 50 and resistor 52.

Instead of a manual control being connected to the base 30 of transistor 22 by the resistor 52 as disclosed in the prior copending application aforementioned, a second audio section 14 is coupled thereto by means of the series connected capacitor 56 and resistor 58 in order to supply a predominating modulating signal when the second audio section 14 is operating. The second audio section 14 consists of an audio frequency oscillator having a transistor 60 of the PNP type. The output collector 62 of transistor 60 is therefore connected to the output coupling capacitor 56 aforementioned. The base 64 of transistor 60 is also coupled to the collector by an audio frequency tuned transformer 66 having inductively coupled windings 68 and 70. The winding 70 is connected between the voltage line 20 and the output collector 62 and is also connected across the tuning capacitor 72 so that an audio frequency oscillating voltage will ordinarily appear at the output collector 62 when the battery 16 is connected to the voltage line 20. The bias condition of the base 64 for this purpose is therefore established by the voltage dividing resistors 74 and 76, resistor 76 being connected across the terminals of the transformer winding 68. Also, a proper bias is maintained on the emitter 78 by the grounded resistor 80.

In order to control the duration of the initial period during which the output of the transmitter is modulated at an audio frequency determined by the tuned transformer 38, the audio oscillator circuit associated with the other tuned transformer 66, is disabled for said initial period by the timing circuit 82. The timing circuit includes a grounded capacitor 84 connected to the transformer winding 68 and to the voltage line 20 through the resistor 74. The capacitor 84 forms an audio bypass path to ground which is shunted by the bleed resistor 86 operating in conjunction with the resistor 74 to control the rate at which the capacitor 84 is charged by the battery 16 upon closing of the push button switch 18. It will therefore be apparent, that initially the capacitor 84 will hold a cutoff voltage on the base 64 of transistor 60 in order to prevent operation of the oscillator circuit until the capacitor is sufficiently charged by the battery 16 through resistor 74.

Figure 2:
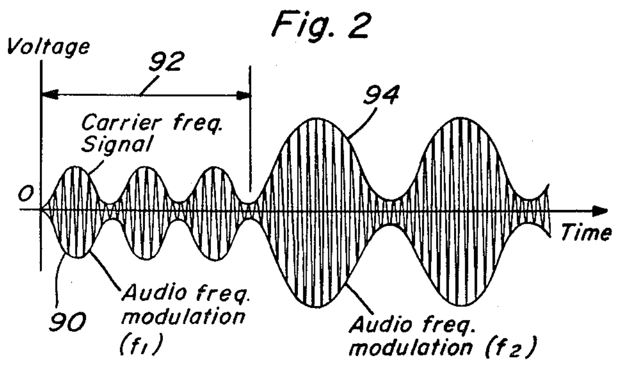
FIGURE 2 is a graphical illustration of typical signal output characteristics of the transmitter.

From the foregoing description, operation of the transmitter circuit will become apparent. Upon closing of the push button power switch 18 voltage is supplied through choke coil 34 to the tank circuit of the combined radio and audio frequency oscillator in the first audio section 12 in order to initiate an oscillating voltage in the inductor loop 26 radiating a signal at the carrier frequency. Also, voltage supplied to line 20 is conducted through the voltage dropping resistor 88 to the winding 48 of audio tuned transformer 38 in order to set it into operation and thereby superimpose an audio modulation envelope 90 at an audio frequency $f_1$ on the carrier signal as graphically depicted in FIGURE 2. Initially, the capacitor 84 is operative to prevent operation of the second audio section 14. When the capacitor 84 has been sufficiently charged at the end of the predetermined period as indicated by reference numeral 92 in FIGURE 2, the audio section 14 begins supplying an audio frequency modulating signal to the base 30 of transistor 22 at a higher energy level than the modulating signal initially supplied by transformer 38 to thereby partially oppose, cancel or reduce the output thereof. The audio frequency oscillator of the second audio section will then superimpose a modulation envelope 94 on the common carrier frequency signal as shown in FIGURE 2. Also, the molulation of the carrier frequency at the second audio frequency $f_2$ will prevent any further audio oscillation at the frequency $f_1$ by clamping the output of transformer 38 because it is reduced below its self-sustaining threshold without affecting the continued radio frequency oscillating output of the transistor 22 at the common carrier frequency until the push button switch 18 is opened.

It will also be apparent from the foregoing, that the circuit arrangement is such as to accommodate separate carrier frequency tuning by the capacitor 28 and audio frequency tuning at the second modulating frequency $f_2$ by means of the transformer 66, each tuning adjustment in no way affecting the other. In order to tune the audio frequency of the modulating circuit including the audio frequency tuned transformer 38, operation of the second audio section 14 is prevented by connecting the base 64 of transistor 60 to ground upon closing of the tuning switch 96. Thus, the audio frequency modulating circuit associated with the tuning transformer 38 will be maintained operating indefinitely in order to permit it to be tuned to the desired modulating frequency $f_1$ upon closing of the power switch 18. Upon opening of the tuning switch 96, the transformer circuit will again be in condition for automatic operation each time the push button switch 18 is closed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a communication system, a transmitter having means for continuously radiating signal energy at a predetermined carrier frequency, means for sequentially modulating said carrier frequency at two different modulating frequencies comprising, a pair of modulating circuits connected to the carrier frequency radiating means, one of said modulating circuits including regenerative coupling means for transmitting signal energy to the radiating means modulating said carrier frequency at one of the two modulating frequencies for a limited period, and timing circuit means connected to the other of the modulating circuits for preventing operation thereof during said limited period initiated by operation of said radiating means.

2. The combination of claim 1 wherein said other of the modulating circuits includes an audio oscillator having an output at a higher energy level than the signal energy transmitted by the regenerative coupling means, and means coupling the audio oscillator to the regenerative coupling means for modulating the output of the radiating means at the other of the two modulating frequencies and clamping operation of the regenerative coupling means to stop modulation of said carrier frequency at said one of the modulating frequencies.

3. The combination of claim 1 including a source of energy, switch means connecting said source of energy to the radiating means and the timing circuit means for initiating operation of the radiating means and the regenerative coupling means during said limited period.

4. A transmitter for continuously radiating signal energy at a common carrier frequency sequentially modulated at at least two different audio frequencies comprising, a radio frequency oscillator having an output tank circuit and an audio modulating control circuit, a constant source of voltage, switch means connecting said source of voltage to the radio frequency oscillator for producing radio frequency oscillations at said carrier frequency in said tank circuit with superimposed audio frequency oscillations from the modulating circuit, an audio frequency oscillator connected to the radio frequency oscillator for modulating the same at another audio frequency while clamping operation of the audio modulating control circuit for an indefinite period, and timing circuit means connected to the switch means and the audio frequency oscillator for disabling the audio oscillator during a limited period initiated by operation of the radio frequency oscillator preceding said indefinite period.

5. The combination of claim 4 wherein each of said oscillators includes a transistor having a base, a collector and an emitter, means coupling the collector of the audio frequency oscillator to the base of the radio frequency oscillator, a first audio frequency tuned transformer coupling the base and collector of the audio frequency oscillator for modulating said common carrier frequency at a higher energy level than the audio frequency oscillations superimposed by said modulating circuit, said modulating circuit including a second audio frequency tuned transformer coupling the base and emitter of the radio frequency oscillator.

6. The combination of claim 5 wherein said timing circuit means includes a capacitor connected to the base of the audio frequency oscillator for holding a cutoff voltage thereon while being charged by said source of voltage upon closing of the switch means.

7. The combination of claim 6 including tuning switch means connected to the base of the transistor of the audio frequency oscillator for grounding thereof to prevent operation of the audio frequency oscillator while the modulating circuit is being tuned.

8. The combination of claim 4 wherein said timing circuit means includes a capacitor connected to the audio frequency oscillator for holding a cutoff voltage thereon while being charged by said source of voltage upon closing of the switch means.

9. The combination of claim 1 wherein said radiating means comprises, a current conducting device having a pair of power electrodes and a control electrode, a tank circuit connected to one of said power electrodes, feedback coupling means connecting the control electrode to the tank circuit for sustaining oscillations therein at said carrier frequency, and means connecting said power electrodes to said regenerative coupling means for sustaining oscillations therein at said one of the modulating frequencies superimposed on the oscillations at said carrier frequency during operation of the radiating means.

10. The combination of claim 9 wherein said timing circuit means includes a source of constant voltage, capacitive means connected to the other of the modulating circuits for preventing operation thereof while being charged during said limited period, and switch means selectively connecting said source of voltage to the radiating means and the capacitive means for simultaneously operating the radiating means and charging the capacitive means.

11. The combination of claim 1 wherein said timing circuit means includes a source of constant voltage, capacitive means connected to the other of the modulating circuits for preventing operation thereof while being charged during said limited period, and switch means selectively connecting said source of voltage to the radiating means and the capacitive means for simultaneously operating the radiating means and charging the capacitive means.

References Cited by the Examiner

UNITED STATES PATENTS

| | | | |
|---|---|---|---|
| 2,460,637 | 2/1949 | Huge | 331—47 |
| 2,826,691 | 3/1958 | Elliott | 331—47 X |
| 2,991,357 | 7/1961 | True | 325—105 |
| 3,082,382 | 3/1963 | Hooper | 325—105 X |
| 3,209,262 | 9/1965 | Reynolds | 325—139 X |

DAVID G. REDINBAUGH, *Primary Examiner.*

JOHN W. CALDWELL, *Examiner.*